(12) United States Patent
Okude et al.

(10) Patent No.: US 6,585,094 B2
(45) Date of Patent: Jul. 1, 2003

(54) POWER TRANSMISSION APPARATUS

(75) Inventors: Yutaka Okude, Tochigi (JP); Mitsuru Kuroda, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/093,993

(22) Filed: Mar. 7, 2002

(65) Prior Publication Data
US 2003/0019707 A1 Jan. 30, 2003

(30) Foreign Application Priority Data
Jul. 26, 2001 (JP) .................................... 2001-226708

(51) Int. Cl.⁷ ............................ F16D 47/00; B60K 17/34
(52) U.S. Cl. ........................ 192/35; 192/48.2; 192/84.7
(58) Field of Search .......................... 192/35, 54.52, 192/48.2, 84.7

(56) References Cited

U.S. PATENT DOCUMENTS

| | | | | |
|---|---|---|---|---|
| 5,398,792 A | * | 3/1995 | Teraoka | 192/48.2 |
| 5,462,496 A | * | 10/1995 | Dick et al. | 192/35 |
| 5,954,173 A | * | 9/1999 | Sakai et al. | 192/35 |
| 6,109,408 A | * | 8/2000 | Ikeda et al. | 192/35 |
| 6,158,561 A | * | 12/2000 | Sakai et al. | 192/35 |
| 6,446,772 B1 | * | 9/2002 | Inose et al. | 192/35 |

FOREIGN PATENT DOCUMENTS

| | | |
|---|---|---|
| JP | 329562 | 12/1998 |
| JP | 291694 | 10/2000 |

* cited by examiner

*Primary Examiner*—Rodney H Bonck
(74) *Attorney, Agent, or Firm*—Orum & Roth

(57) ABSTRACT

In a power transmission apparatus, a sub-clutch apparatus is arranged between the input shaft and an intermediate rotary body, a main clutch apparatus is arranged between the intermediate rotary body and the output shaft, and a cam apparatus converting the frictional engagement force of the sub-clutch apparatus into the pressing force for the main clutch apparatus.

4 Claims, 2 Drawing Sheets

POWER TRANSMISSION APPARATUS

BACKGROUND OF THE INVENTION

1. Field of the Invention

The present invention relates to a power transmission apparatus.

2. Description of the Related Art

In a rear wheel side power transmission system of a four-wheel drive vehicle, such as a power transmission apparatus arranged between an input shaft in a side of a propeller shaft and an output shaft in a side of a rear differential gear which executes a torque transmission from the input shaft to the output shaft, for example, there is a structure described in Japanese Patent Application Laid-Open (JP-A) No. 10-329562.

The conventional power transmission apparatus has a sub-clutch apparatus connected to the input shaft which operates according to an electric current application so as to frictionally engage, a main clutch apparatus arranged between the input shaft and the output shaft. The main clutch is frictionally engaged due to a pressing force, thereby executing a torque transmission between the input shaft and the output shaft. A cam apparatus converts a frictional engagement force of the sub clutch apparatus into the pressing force for the main clutch apparatus.

In the prior art, both of the sub-clutch apparatus and the main clutch apparatus are connected to the input shaft. Both of a drive side clutch plate of the sub clutch apparatus and a drive side clutch plate of the main clutch apparatus rotate together with the input shaft when the sub-clutch apparatus is set in a non-engagement state in which an electric current is not applied, so that inertial loss becomes great.

SUMMARY OF THE INVENTION

An object of the present invention, in a power transmission apparatus having the sub-clutch apparatus and a main clutch apparatus, is to reduce inertial loss when the sub-clutch apparatus is in a non-engaged state.

According to the present invention, there is disclosed a power transmission apparatus arranged between an input shaft and an output shaft, so as to execute torque transmission.

A sub-clutch apparatus is arranged between the input shaft and an intermediate rotary body and is operated by an electric current application so as to be frictionally engaged, thereby executing a torque transmission between the input shaft and the intermediate rotary body.

A main clutch apparatus is arranged between the intermediate rotary body and the output shaft which is frictionally engaged according to a pressing force, thereby executing a torque transmission between the intermediate rotary body and the output shaft.

Also, a cam apparatus converts the frictional engagement force of the sub-clutch apparatus into the pressing force for the main clutch apparatus.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

Figure 1:
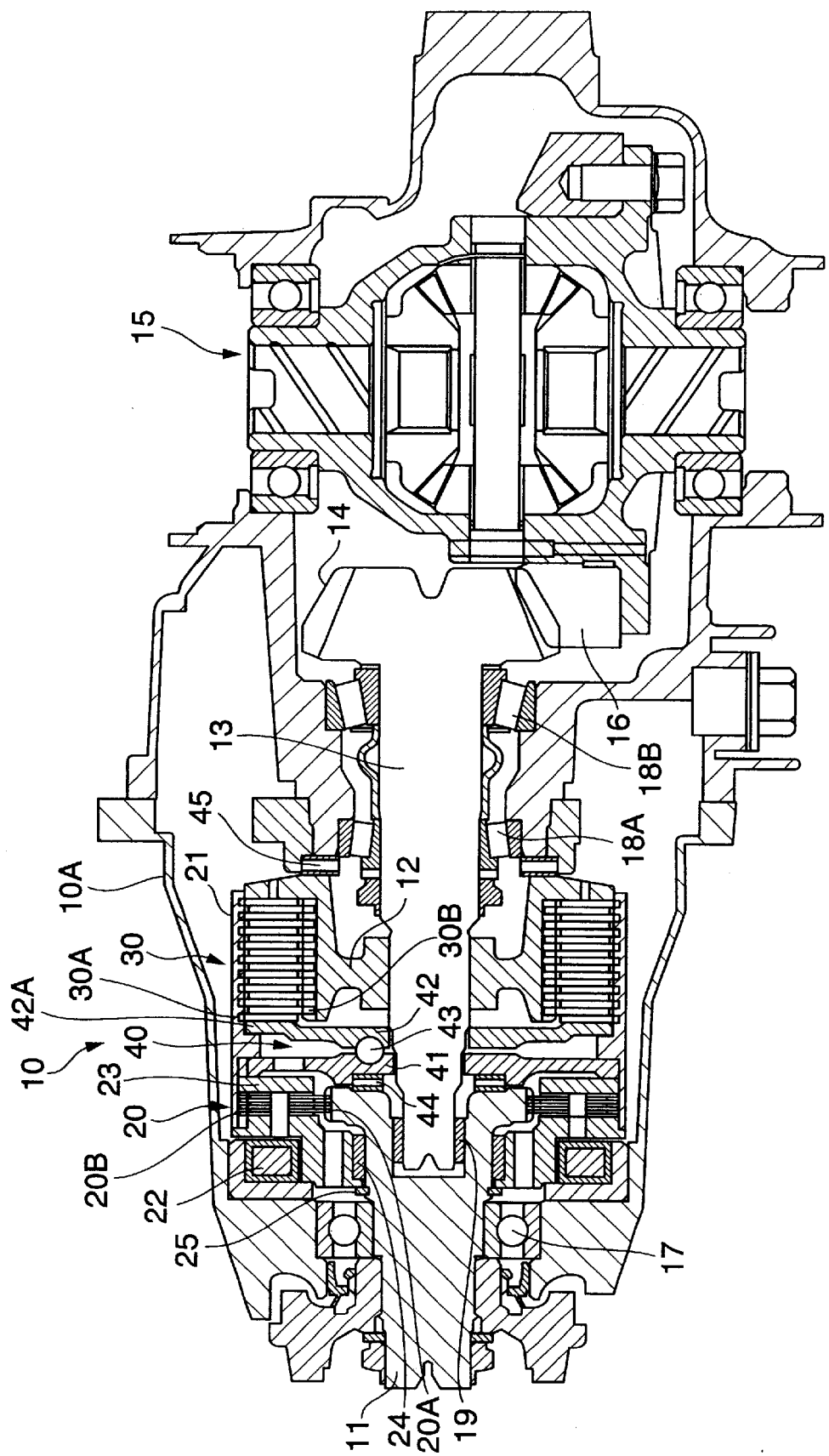
FIG. 1 is a cross sectional view showing a power transmission apparatus.
Figure 2:
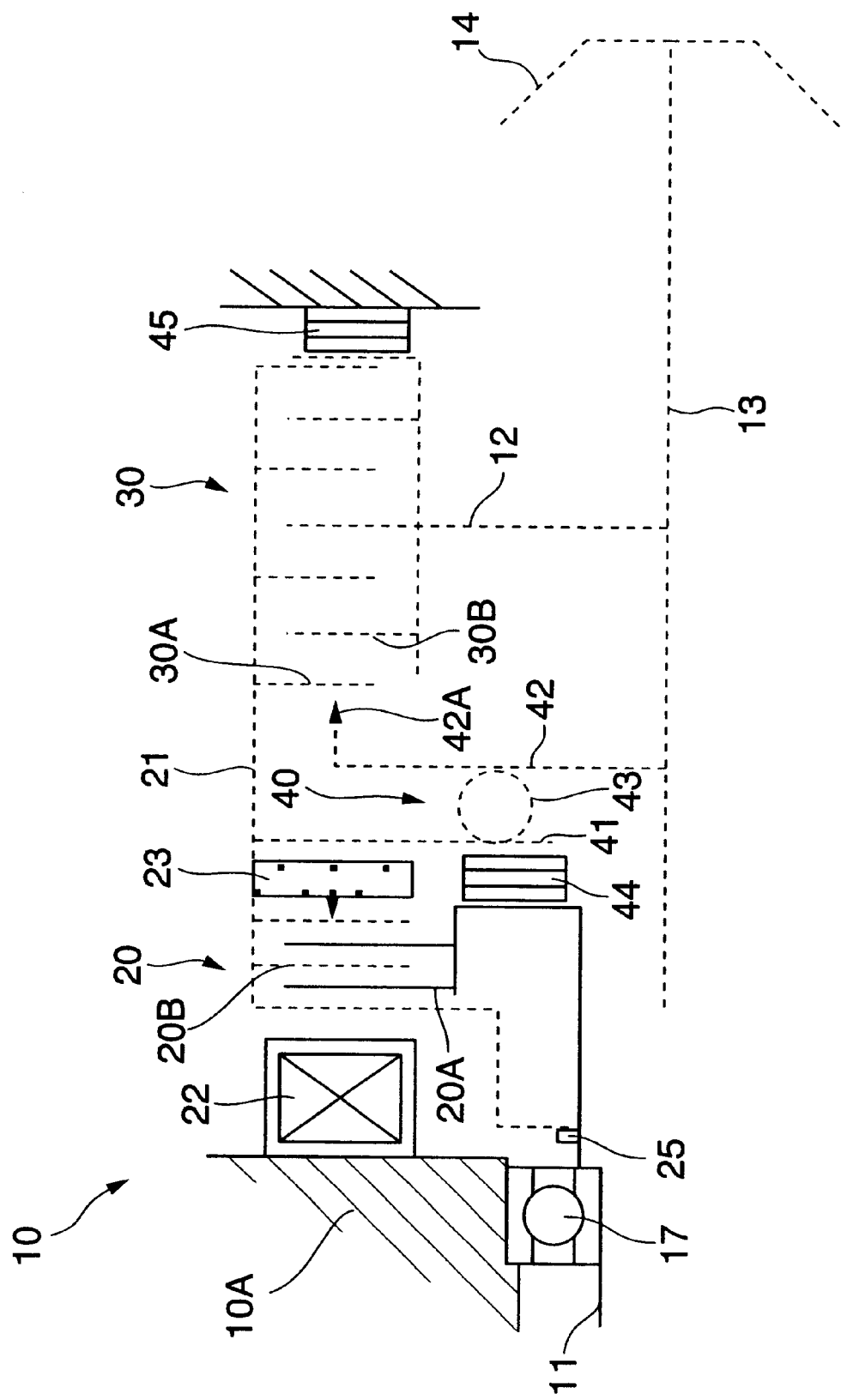
FIG. 2 is a schematic view of FIG. 1.

A power transmission apparatus 10 is arranged in a rear wheel side power transmission system of a four-wheel drive vehicle. It is structured such that an input shaft 11 and an output shaft 12 are coaxially arranged in an inner portion of a differential carrier 10A. A rear end portion of a propeller shaft is connected to the input shaft 11. A drive pinion shaft 13 is spline connected to the output shaft 12, and a drive pinion 14 integrally formed with the drive pinion shaft 13 is engaged with a ring gear 16 of a rear differential gear 15. The power transmission apparatus 10 is structured such as to engage and disengage torque transmission between the input shaft 11 and the output shaft 12. When the input shaft 11 and the output shaft 12 are connected to each other, the vehicle operates in a four-wheel drive state, and the drive force of the engine is distributed to right and left rear wheels via the rear differential gear 15. When the connection between the input shaft 11 and the output shaft 12 is cancelled, the rear wheel side power transmission system following after the rear differential gear 15 is disengaged, and the vehicle operates in a two-wheel drive state powered only by front wheels. In this case, the input shaft 11 is rotatably supported by a differential carrier 10A via a bearing 17. The drive pinion shaft 13 is integrally formed with the output shaft 12 and is rotatably supported to the differential carrier 10A via bearings 18A and 18B, and is coaxially supported to the input shaft 11 via a bearing 19.

The power transmission apparatus 10 has a sub-clutch apparatus 20, a main clutch apparatus 30 and a cam apparatus 40.

(Sub-Clutch Apparatus 20)

The sub-clutch apparatus 20 is arranged between the input shaft 11 and an intermediate rotary body 21. It is operated by a system which presses an armature 23 attracted by an electric current application of an electromagnet 22 to an electromagnetic coil so as to frictionally engage, thereby executing torque transmission between the input shaft 11 and the intermediate rotary body 21.

The sub-clutch apparatus 20 is constituted by a plurality of clutch plates 20A and 20B. The drive side clutch plate 20A is spline connected to an outer periphery of the input shaft 11, so as to be assembled in such a manner as to be capable of moving in an axial direction. The driven side clutch plate 20B is spline connected to an inner periphery of the intermediate rotary body 21, so as to be capable of moving in an axial direction. The drive side clutch plate 20A and the driven side clutch plate 20B are alternately arranged. They are brought into contact with each other so as to be frictionally engaged, thereby moving apart from each other so as to operate in a free state.

The intermediate rotary body 21 is rotatably supported to the input shaft 11 via a bearing 24. Further, the intermediate rotary body 21 collides with a stopper 25 engaged with and attached to the outer periphery of the input shaft 11 in an axial direction.

The electromagnet 22 is formed in an annular shape and is assembled in the differential carrier 10A.

The armature 23 is formed in an annular shape, and is spline connected to an inner periphery of the intermediate rotary body 21. The armature 23 is assembled so as to be capable of moving in an axial direction, in an opposite side to the electromagnet 22 gripping the sub-clutch apparatus 20 therebetween.

(Main Clutch Apparatus 30)

The main clutch apparatus 30 is arranged between the intermediate rotary body 21 and the output shaft 12 and is frictionally engaged according to a pressing operation of a pressure plate 42 mentioned above, of a cam apparatus 40. A torque transmission is thereby executed between the intermediate rotary body 21 and the output shaft 12.

The main clutch apparatus 30 is constituted by a plurality of clutch plates 30A and 30B. The drive side clutch plate 30A is spline connected to an inner periphery of the intermediate rotary body 21, so as to be assembled in such a manner as to be capable of moving in an axial direction. The driven side clutch plate 30B is spline connected to an outer periphery of the output shaft 12, so as to be capable of moving in an axial direction. The drive side clutch plate 30A and the driven side clutch plate 30B are alternately arranged. They are brought into contact with each other so as to be frictionally engaged, thereby executing the torque transmission between the intermediate rotary body 21 and the output shaft 12. They are capable of moving apart from each other so as to operate in a free state.

(Cam Apparatus 40)

The cam apparatus 40 converts a frictional engagement force of the sub-clutch apparatus 20 and further a rotary force of the intermediate rotary body 21 into a pressing force for the main clutch apparatus 30.

The cam apparatus 40 is arranged between the sub-clutch apparatus 20 and the main clutch apparatus 30 in an inner peripheral side of the intermediate rotary body 21. It has a cam plate 41, a pressure plate 42 and a ball cam 43. The cam plate 41 is spline connected to the inner periphery of the intermediate rotary body 21, so as to be assembled in such a manner as to be capable of moving in an axial direction. The pressure plate 42 is spline connected to an outer periphery of a drive pinion shaft 13 integrally formed with the output shaft 12 and is assembled in such a manner as to be capable of moving in an axial direction. The cam plate 41 and the pressure plate 42 are provided with cam grooves, opposing each other on opposing surfaces thereof, which interposed a ball cam 43 between both of the cam grooves. The cam plate 41 is backed up on an end surface of the input shaft 11 via a thrust bearing 44. The pressure plate 42 can bring a pressing portion 42A into contact with the clutch plate 30A (or 30B) in one end side of the main clutch apparatus 30. In this case, the output shaft 12 is backed up to the differential carrier 10A via a thrust bearing 45.

A description will be given below of the power transmitting motion executed by the power transmission apparatus 10.

(1) When the electromagnet 22 is excited, the armature 23 is attracted, the sub-clutch apparatus 20 is frictionally engaged, and in the case that a relative rotational difference is going to be generated between the intermediate rotary body 21 and the output shaft 12, a torque of the intermediate rotary body 21 is applied to the ball cam 43. A generated cam thrust force presses the main clutch apparatus 30 via the pressure plate 42 so as to frictionally engage. Accordingly, the input shaft 11 and the output shaft 12 are connected to each other via the intermediate rotary body 21. The drive force of the engine is transmitted to the rear wheels, whereby the vehicle becomes operable in a four-wheel drive mode.

When the sub-clutch apparatus 20 slips according to a control of an exciting electric current of the electromagnet 22, the cam thrust force of the ball cam 43 is changed, and the frictional engaging force of the main clutch apparatus 30 is changed. When this occurs the drive force that is transmitted to the rear wheels is adjusted. By controlling a drive force distribution ratio between the front wheels and the rear wheels in the manner mentioned above, it is possible to control the steering function and the stability of the vehicle during turning.

(2) When the excitation of the electromagnet 22 is stopped, the sub-clutch 20 is disengaged. The cam thrust force of the ball cam 43 is canceled, and the main clutch apparatus 30 is also disengaged. The connection between the input shaft 11 and the output shaft 12 is canceled, so that the vehicle becomes operable in a two-wheel drive mode.

According to the present embodiment, the following effects can be obtained.

Only the sub-clutch apparatus 20 is connected to the input shaft 11. Accordingly, when setting the sub-clutch apparatus 20 in the non-engagement state (two-wheel drive) in which no electric current is applied, only the drive side clutch plate 20A of the sub clutch apparatus 20 rotates together with the input shaft 11. The drive side clutch plate 30A of the main clutch apparatus 30 does not rotate together therewith, so it is possible to reduce an inertial loss.

As previously explained, embodiments of the present invention have been described in detail with reference to the drawings. However, specific configurations of the present invention are not limited to the embodiments but those having a modification of the design within the range of the present invention are also included in the present invention. For example, the power transmission apparatus according to the present invention is not limited to the structure arranged in the rear wheel power transmission system of a four-wheel drive vehicle. It could be widely applied to a virtually any structure which is arranged between the input shaft and the output shaft, so as to execute torque transmission.

As mentioned above, according to the present invention, in the power transmission apparatus having the sub-clutch apparatus and the main clutch apparatus, it is possible to reduce the inertial loss in the input side when setting the sub-clutch apparatus in the non-engagement state.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as being limited to the specific embodiment set out above, but should be understood to include all possible embodiments which can be embodied within a scope encompassed and equivalents thereof with respect to the features set out in the appended claims.

What is claimed is:

1. A power transmission apparatus arranged between an input shaft and an output shaft, so as to execute a torque transmission comprising:

a sub-clutch apparatus arranged between the input shaft and an intermediate rotary body and operated by an electric current application, so as to be frictionally engaged, thereby executing a torque transmission between the input shaft and the intermediate rotary body;

a main clutch apparatus arranged between the intermediate rotary body and the output shaft and frictionally engaged by a pressing force, thereby executing a torque transmission between the intermediate rotary body and the output shaft; and a cam apparatus arranged and constructed to convert the frictional engagement force of the sub-clutch apparatus into the pressing force for the main clutch apparatus.

2. A power transmission apparatus as claimed in claim 1, wherein the intermediate rotary body is rotatably supported to the input shaft.

3. A power transmission apparatus as claimed in claim 1, wherein an annular armature is spline connected to an inner periphery of the intermediate rotary body, and is assembled in such a manner as to be capable of moving in an axial direction, and an electromagnet is provided on an opposite side to the armature with respect to the sub clutch apparatus.

4. A power transmission apparatus as claimed in claim 2, wherein an annular armature is spline connected to an inner periphery of the intermediate rotary body, and is assembled in such a manner as to be capable of moving in an axial direction, and an electromagnet is provided on an opposite side to the armature with respect to the sub clutch apparatus.

* * * * *